(12) United States Patent
Oowada (10) Patent No.: US 10,705,285 B2
(45) Date of Patent: Jul. 7, 2020

(54) POLARIZING PLATE AND OPTICAL APPARATUS PROVIDED WITH THE SAME

(71) Applicant: Dexerials Corporation, Tokyo (JP)

(72) Inventor: Masahiro Oowada, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 16/449,751

(22) Filed: Jun. 24, 2019

(65) Prior Publication Data

US 2019/0391320 A1  Dec. 26, 2019

(30) Foreign Application Priority Data

Jun. 26, 2018 (JP) .................. 2018-120596

(51) Int. Cl.
*F21V 8/00* (2006.01)
*G02F 1/1335* (2006.01)

(52) U.S. Cl.
CPC ......... *G02B 6/0056* (2013.01); *G02B 6/0031* (2013.01); *G02F 1/133528* (2013.01); *G02F 2001/133548* (2013.01)

(58) Field of Classification Search
CPC .............. G02B 6/0056; G02B 6/0031; G02F 1/133528; G02F 2001/133548
See application file for complete search history.

(56) References Cited

U.S. PATENT DOCUMENTS

| | | |
|---|---|---|
| 8,593,732 B1 | 11/2013 | Greiner et al. |
| RE45,642 E | 8/2015 | Takada |
| 2003/0180024 A1 | 9/2003 | Edlinger et al. |
| 2004/0239833 A1 | 12/2004 | Kawazu et al. |

(Continued)

FOREIGN PATENT DOCUMENTS

| | | |
|---|---|---|
| JP | 2002328222 A | 11/2002 |
| JP | 2005517973 A | 6/2005 |

(Continued)

OTHER PUBLICATIONS

Office Action issued in the counterpart Japanese Patent Application No. 2018120596, dated Sep. 25, 2018 (2 pages).

(Continued)

*Primary Examiner* — Kevin Quarterman
(74) *Attorney, Agent, or Firm* — Osha Liang LLP (57) ABSTRACT

Provided is a polarizing plate having high transmittance characteristics and high durability.
A polarizing plate 1 with a wire grid structure includes a transparent substrate 10, and a grid-shaped projecting portion 11 which is arranged on the transparent substrate 10 at a pitch shorter than a wavelength of light in a used bandwidth and extends in a predetermined direction. The grid-shaped projecting portion 11 includes a reflection layer 12, a dielectric layer 13, and an absorption layer 14 in this order from the side of the transparent substrate 10. A protection layer 15 is provided on a surface of the grid-shaped projecting portion 11, and covers all of an upper surface and a side surface of the absorption layer 14 and all of a side surface of the dielectric layer 13, and at least a part of a side surface of the reflection layer 12. The protection layer 15 on the side surface of the reflection layer 12 is thinner than the protection layer 15 on the side surface of the absorption layer 14.

20 Claims, 8 Drawing Sheets

(56) References Cited

U.S. PATENT DOCUMENTS

| | | | |
|---|---|---|---|
| 2008/0186576 A1* | 8/2008 | Takada | G02B 5/3025 359/487.03 |
| 2009/0066885 A1 | 3/2009 | Kumai | |
| 2010/0103517 A1 | 4/2010 | Davis et al. | |
| 2011/0052802 A1 | 3/2011 | Kaida et al. | |
| 2013/0215507 A1* | 8/2013 | Sasaki | G02B 5/3058 359/485.05 |
| 2014/0063467 A1* | 3/2014 | Takahashi | G02B 5/3058 353/20 |
| 2015/0029438 A1* | 1/2015 | Chung | G02F 1/133502 349/62 |
| 2018/0180785 A1 | 6/2018 | Takeda | |

FOREIGN PATENT DOCUMENTS

| | | |
|---|---|---|
| JP | 2008216957 A | 9/2008 |
| JP | 2009069382 A | 4/2009 |
| JP | 2012103728 A | 5/2012 |
| JP | 2015121693 A | 7/2015 |
| JP | 6230689 B1 | 11/2017 |
| WO | 2009125751 A1 | 10/2009 |
| WO | 2015056191 A1 | 4/2015 |

OTHER PUBLICATIONS

Office Action issued in the counterpart Japanese Patent Application No. 2018120596, dated Jan. 29, 2019 (1 page).

* cited by examiner

POLARIZING PLATE AND OPTICAL APPARATUS PROVIDED WITH THE SAME

This application is based on and claims the benefit of priority from Japanese Patent Application No. 2018-120596, filed on 26 Jun. 2018, the content of which is incorporated herein by reference.

BACKGROUND OF THE INVENTION

Field of the Invention

The present invention relates to a polarizing plate and an optical apparatus including the polarizing plate.

Related Art

A polarizing plate is an optical element that absorbs polarized light in an absorption axis direction and transmits the polarized light in a transmission axis direction which is orthogonal to the absorption axis direction. In recent years, a wire grid-type inorganic polarizing plate has begun to be adopted in place of an organic polarizing plate in optical apparatuses such as liquid crystal projectors requiring heat resistance.

The inorganic polarizing plate includes a reflection layer, a dielectric layer, and an absorption layer in the order from a transparent substrate side thereof. Further, each of these inorganic layers is formed by, for example, a physical film forming method, and a wire grid-type polarizer pattern is formed by technologies including photolithography and dry etching.

However, the polarizing plate used in an optical apparatus such as an image display device is exposed to an environment of high temperature and high humidity or a dusty environment upon practical use. As a result, oxidation and corrosion of the polarizing plate may occur to adversely affect the optical characteristics, resulting in two-dimensional distortion, distortion of color, and the like, of a displayed image.

To address this, in a wire grid-type inorganic polarizing plate, a polarizing plate made by providing an inorganic fine particle layer constituting an absorption layer on a side surface of a top portion of a dielectric layer has been proposed (for example, see Japanese Unexamined Patent Application, Publication No. 2012-103728). With this polarizing plate, it is said that high durability against intense light can be obtained.

Patent Document 1: Japanese Unexamined Patent Application, Publication No. 2012-103728

SUMMARY OF THE INVENTION

However, with the polarizing plate of Japanese Unexamined Patent Application Publication No. 2012-103728, it is difficult to obtain high durability while maintaining high transmittance characteristics.

The present invention is made to address such a difficulty, and it is an object of the present invention to provide a polarizing plate having high transmittance characteristics and high durability.

(1) In order to achieve the abovementioned object, the present invention provides a polarizing plate (for example, a polarizing plate 1 to be described later) with a wire grid structure, the polarizing plate including: a transparent substrate (for example, a transparent substrate 10 to be described later); and a grid-shaped projecting portion (for example, a grid-shaped projecting portion 11 to be described later) that is arranged on the transparent substrate at a pitch shorter than a wavelength of light in a used bandwidth, and extends in a predetermined direction, in which the grid-shaped projecting portion includes a reflection layer (for example, a reflection layer 12 to be described later), a dielectric layer (for example, a dielectric layer 13 to be described later), and an absorption layer (for example, an absorption layer 14 to be described later) in order from a side of the transparent substrate, a protection layer (for example, a protection layer 15 to be described later) is provided on a surface of the grid-shaped projecting portion, and is configured to cover all of an upper surface and a side surface of the absorption layer and all of a side surface of the dielectric layer, and cover at least a part of a side surface of the reflection layer, and the protection layer on the side surface of the reflection layer is thinner than the protection layer on the side surface of the absorption layer.

(2) In the polarizing plate of (1), the protection layer on the side surface of the reflection layer may be thinner than the protection layer on the side surface of the dielectric layer, and the protection layer on the side surface of the dielectric layer may be thinner than the protection layer on the side surface of the absorption layer.

(3) In the polarizing plate of (1) or (2), the protection layer on the side surface of the absorption layer, on the side surface of the dielectric layer, and on the side surface of the reflection layer may become thinner as approaching the transparent substrate along the side surfaces.

(4) In the polarizing plate of any one of (1) to (3), the protection layer on the side surface of the reflection layer may cover 50% or less of an entire side surface of the grid-shaped projecting portion.

(5) In the polarizing plate of any one of (1) to (4), an angle of a side surface incident angle α may be calculated by equation (1) below, the side surface incident angle α (for example, a side surface incident angle α) being defined by an angle formed by incident light (for example, incident light L to be described later) that is incident from a direction perpendicular to a main surface of the transparent substrate and a side incident surface normal line (for example, a side incident surface normal line N to be described later) that is orthogonal to the side surface of the protection layer,

[Equation 1]

$$\alpha = 90 - \tan^{-1}\left(\frac{\frac{(D-d)}{2}}{c(t1+t2+t3)}\right) (deg) \quad (1)$$

in which D represents a maximum width (nm) of the protection layer, d represents a width (nm) of the grid-shaped projecting portion, c represents a coverage (c≤0.5) of the protection layer on the side surface of the grid-shaped projecting portion, t1 represents a film thickness (nm) of the absorption layer, t2 represents a film thickness (nm) of the dielectric layer, and t3 represents a film thickness (nm) of the reflection layer.

(6) In the polarizing plate of any one of (1) to (5), each of the reflection layer, the dielectric layer, the absorption layer, and the protection layer may include an inorganic material.

(7) In the polarizing plate of any one of (1) to (6), a water-repellent layer covering the protection layer may be provided on a surface of the grid-shaped projecting portion.

(8) In the polarizing plate of any one of (1) to (7), the water-repellent layer may include fluorine and have a thickness of 5 nm or less.

(9) An optical apparatus including a polarizing plate according to any one of (1) to (8) is provided.

According to the present invention, it is possible to provide a polarizing plate having high transmittance characteristics and high durability.

DETAILED DESCRIPTION OF THE INVENTION

Hereinafter, exemplary embodiments of the present invention will be described in detail with reference to the drawings.

(Polarizing Plate)

A polarizing plate according to an exemplary embodiment of the present invention is an inorganic polarizing plate with a wire grid structure. The polarizing plate includes a transparent substrate and a grid-shaped projecting portion. The grid-shaped projecting portion may include a plurality of grid-shaped projecting portions. The grid-shaped projecting portions are arranged on the transparent substrate at a pitch (e.g., cycle) shorter than a wavelength of light in a used bandwidth, and extend in a predetermined direction. Further, the grid-shaped projecting portion has a reflection layer, a dielectric layer, and an absorption layer in order from the transparent substrate side.

Figure 1:
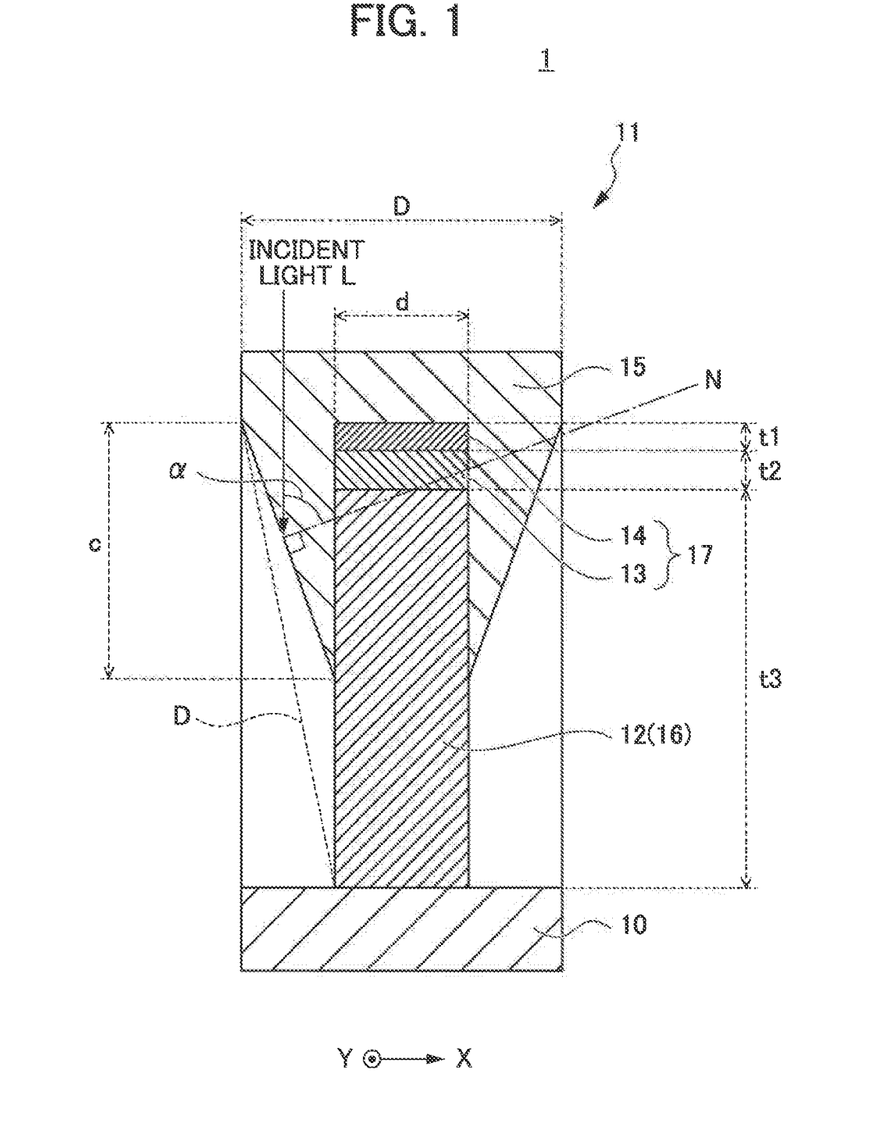
FIG. 1 is a schematic cross-sectional view of a polarizing plate according to an embodiment of the present invention.

FIG. 1 is a schematic cross-sectional view of a polarizing plate 1 according to an exemplary embodiment of the present invention. As illustrated in FIG. 1, the polarizing plate 1 includes a transparent substrate 10 and a grid-shaped projecting portion 11. The transparent substrate 10 is transparent to light in a used bandwidth. The grid-shaped projecting portions 11 are arranged on one surface of the transparent substrate 10 at a pitch shorter than the wavelength of the light in the used bandwidth. The grid-shaped projecting portion 11 includes, in order from the transparent substrate 10, a reflection layer 12, a dielectric layer 13, and an absorption layer 14. In other words, the polarizing plate 1 has a wire grid structure in which the grid-shaped projecting portions 11, which are formed by stacking the reflection layer 12, the dielectric layer 13, and the absorption layer 14 in this order from the transparent substrate 10 side, are arranged in a one-dimensional grid pattern on the transparent substrate 10.

Further, the polarizing plate 1 includes a protection layer 15 formed on the surface of the grid-shaped projecting portion 11. The protection layer 15 will be described in detail later.

Here, as illustrated in FIG. 1, the direction in which the grid-shaped projecting portion 11 extends (predetermined direction) is referred to as a Y-axis direction. Further, a direction orthogonal to the Y-axis direction and in which the grid-shaped projecting portion 11 is arranged on a main surface of the transparent substrate 10 is referred to as an X-axis direction. In this case, the light incident on the polarizing plate 1 is preferably incident from a direction orthogonal to the X-axis direction and the Y-axis direction on the side of the transparent substrate 10 on which the grid-shaped projecting portion 11 is formed.

The polarizing plate 1 attenuates a polarized wave (TE wave (S wave)) having an electric field component parallel to the Y-axis direction and transmits the polarized wave (TM wave (P wave)) having an electric field component parallel to the X-axis direction by using the four functions of transmission, reflection, interference, and selective light absorption of polarized waves by optical anisotropy. Therefore, the Y-axis direction indicates the direction of the absorption axis of the polarizing plate 1, and the X-axis direction indicates the direction of the transmission axis of the polarizing plate 1.

Light incident from the side of the polarizing plate 1 on which the grid-shaped projecting portion 11 is formed is partially absorbed and attenuated when passing through the protection layer 15, the absorption layer 14, and the dielectric layer 13. Among the light transmitted through the protection layer 15, the absorption layer 14, and the dielectric layer 13, the polarized wave (TM wave (P wave)) transmits through the reflection layer 12 with high transmittance. Meanwhile, among the light transmitted through the protection layer 15, the absorption layer 14, and the dielectric layer 13, the polarized wave (TE wave (S wave)) is reflected by the reflection layer 12. When the TE wave reflected by the reflection layer 12 passes through the protection layer 15, the absorption layer 14, and the dielectric layer 13, the TE wave is partially absorbed, and is partially reflected back to the reflection layer 12. Further, the TE wave reflected by the reflection layer 12 attenuates by interference when passing through the protection layer 15, the absorption layer 14, and the dielectric layer 13. With such a configuration as described above, the polarizing plate 1 selectively attenuates the TE wave to obtain the desired polarization characteristics.

As illustrated in FIG. 1, the grid-shaped projecting portion 11 has a rectangular grid leg portion 16 and a rectangular grid tip portion 17 when viewed from a direction in which each one-dimensional grid extends (hereinafter, referred to as a predetermined direction), i.e. in a cross-sectional view orthogonal to the predetermined direction. The grid leg portion 16 is formed to extend perpendicularly from the transparent substrate 10. The grid leg portion 16 is constituted by the reflection layer 12. In other words, the boundary between the grid leg portion 16 and the grid tip portion 17 is located at the boundary between the reflection layer 12 and the dielectric layer 13. The grid tip portion 17 has a rectangular shape when viewed from the predetermined direction. The grid tip portion 17 is constituted by the dielectric layer 13 and the absorption layer 14.

Here, in the following descriptions, height direction indicates a direction perpendicular to the main surface of the transparent substrate 10, and width indicates a dimension in the X-axis direction orthogonal to the height direction when viewed from the Y-axis direction along the direction in which the grid-shaped projecting portion 11 extends. Further, when the polarizing plate 1 is viewed from the Y-axis direction along the direction in which the grid-shaped projecting portion 11 extends, the repetition interval of the grid-shaped projecting portion 11 in the X-axis direction is referred to as a pitch P (not illustrated).

The pitch P of the grid-shaped projecting portion 11 is not particularly limited as long as the pitch is shorter than the wavelength of the light in the used bandwidth. From the viewpoint of ease of fabrication and stability, the pitch P of the grid-shaped projecting portion 11 is preferably 100 nm to 200 nm, for example. The pitch P of the grid-shaped projecting portion 11 is able to be measured by observation with a scanning type electron microscope or a transmission type electron microscope. For example, by using a scanning type electron microscope or a transmission type electron microscope, the pitch P is measured at four arbitrary locations, and the arithmetic average value thereof is able to be set as the pitch P of the grid-shaped projecting portion 11. Hereinafter, this measurement method is referred to as electron microscopy.

The transparent substrate 10 is not particularly limited as long as it has a light-transmitting property with respect to light in the used bandwidth and can be appropriately selected according to the purpose. The phrase "exhibiting a light-transmitting property with respect to light in a used bandwidth" does not mean that the light-transmitting property in the used bandwidth is 100%, and may indicate a light-transmitting property capable of maintaining a function as a polarizing plate. Examples of the light in the used bandwidth include visible light having a wavelength of about 380 nm to 810 nm.

The shape of the main surface of the transparent substrate 10 is not particularly limited, and the shape (for example, a rectangular shape) is appropriately selected according to a purpose. The average thickness of the transparent substrate 10 is preferably 0.3 mm to 1 mm, for example.

As the material constituting the transparent substrate 10, a material having a refractive index of 1.1 to 2.2 is preferable, and examples of the constituent material include glass, quartz, and sapphire. From the viewpoints of cost and light transmittance, it is preferable to use glass, in particular, quartz glass (refractive index of 1.46) or soda lime glass (refractive index of 1.51). The composition of the components of the glass material is not particularly limited, and for example, an inexpensive glass material such as silicate glass widely distributed as optical glass can be used.

From the viewpoint of thermal conductivity, it is preferable to use quartz or sapphire having high thermal conductivity. This allows high light resistance against intense light to be obtained, and it is preferably used as a polarizing plate for an optical engine of a projector that generates a large amount of heat.

Further, when a transparent substrate made of an optically active crystal such as quartz is used, it is preferable to arrange the grid-shaped projecting portion 11 in a direction parallel to or perpendicular to the optical axis of the crystal. This allows for excellent optical characteristics to be obtained. Here, optical axis indicates a direction axis in which a difference in refractive index between O (ordinary ray) and E (extraordinary ray) of light traveling in that direction becomes minimum.

The shape of the transparent substrate 10 is not particularly limited, and may be, for example, a wafer shape of φ 6 inches or φ 8 inches. When the transparent substrate 10 is formed in a wafer shape, for example, a rectangular polarizing plate 1 is obtained by forming the grid-shaped projecting portion 11, and then cutting into arbitrary dimensions by a scribing device or the like.

The reflection layer 12 is formed on the transparent substrate 10, and is formed by arranging a metal film extending in a band shape in the Y-axis direction, which is an absorption axis. More specifically, the reflection layer 12 extends perpendicularly from the transparent substrate 10 side thereof, and has a rectangular shape when viewed from the predetermined direction, i.e. in a cross-sectional view orthogonal to the predetermined direction. The reflection layer 12 has a function as a wire grid type polarizer, attenuates a polarized wave (TE wave (S wave)) having an electric field component in a direction parallel to the longitudinal direction of the reflection layer 12, and transmits a polarized wave (TM wave (P wave)) having an electric field component in a direction orthogonal to the longitudinal direction of the reflection layer 12.

The constituent material of the reflection layer 12 is not particularly limited as long as it is a material having reflectivity with respect to light in the used bandwidth. Examples of the material include, for example, a single element such as Al, Ag, Cu, Mo, Cr, Ti, Ni, W, Fe, Si, Ge, or Te, or an alloy containing one or more of these elements. Among these, the reflection layer 12 is preferably made of aluminum or an aluminum alloy. It should be noted that, in addition to these metal materials, the reflection layer 12 may be formed of, for example, an inorganic film or a resin film other than a metal formed to have a high surface reflectance by coloring or the like.

The film thickness of the reflection layer 12 is not particularly limited, and it is preferably 100 nm to 300 nm, for example. It should be noted that the film thickness of the reflection layer 12 is able to be measured by, for example, the electron microscopy method described above.

The dielectric layer 13 is formed on the reflection layer 12, and is formed by arranging a dielectric film extending in a band shape in the Y-axis direction, which is an absorption axis. The dielectric layer 13 is formed to have a film thickness in which the phase of the polarized light reflected by the reflection layer 12 after passing through the absorption layer 14 is shifted by half a wavelength with respect to the polarized light reflected by the absorption layer 14. Specifically, the film thickness of the dielectric layer 13 is appropriately set in a range of 1 to 500 nm in which the interference effect can be enhanced by adjusting the phase of polarized light. The film thickness of the dielectric layer 13 is able to be measured by, for example, the electron microscopy method described above.

Materials for forming the dielectric layer 13 include, for example, common materials such as silicon oxides such as $SiO_2$, metallic oxides such as $Al_2O_3$, beryllium oxide, and bismuth oxide, $MgF_2$, cryolite, germanium, titanium dioxide, silicon, magnesium fluoride, boron nitride, boron oxide, tantalum oxide, carbon, and combinations thereof. Among these, the dielectric layer 13 is preferably made of Si oxide.

The refractive index of the dielectric layer 13 is preferably greater than 1.0 and less than or equal to 2.5. Since the optical characteristics of the reflection layer 12 is also affected by the refractive index of the surroundings, the polarizing plate characteristics can be controlled by selecting the material of the dielectric layer 13. Further, by appropriately adjusting the film thickness and the refractive index of the dielectric layer 13, a part of the TE wave reflected by the reflection layer 12 can be reflected and returned to the reflection layer 12 when the TE wave is transmitted through the absorption layer 14, and the light passing through the absorption layer 14 can be attenuated by interference. Performing selective attenuation of the TE wave in this manner makes it possible to obtain the desired polarization characteristics.

The absorption layer 14 is formed on the dielectric layer 13 and arranged to extend in a band shape in the Y-axis direction, which is an absorption axis. As a material constituting the absorption layer 14, one or more materials having a light absorption function, such as a metal material, a semiconductor material, or the like, whose optical constant has a non-zero extinction constant, are exemplified, and are appropriately selected according to a wavelength range of light to be applied. Examples of the metal material include a single element such as Ta, Al, Ag, Cu, Au, Mo, Cr, Ti, W, Ni, Fe, and Sn, or an alloy containing one or more of these elements. Further, examples of the semiconductor material include Si, Ge, Te, ZnO, and a silicide material (e.g., $\beta$-FeSi$_2$, MgSi$_2$, NiSi$_2$, BaSi$_2$, CrSi$_2$, CoSi$_2$, and TaSi). Using these materials makes it possible for the polarizing plate 1 to obtain a high extinction ratio with respect to a visible light region to be applied. Among these, it is preferable for the absorption layer 14 to contain Fe or Ta and also contain Si.

In a case where a semiconductor material is used as the absorption layer 14, the band gap energy of the semiconductor is involved in the absorption function. Therefore, the band gap energy needs to be equal to or lower than the used bandwidth. For example, when the material is used with visible light, it is necessary to use a material having absorption at a wavelength of 400 nm or more, that is, a band gap of 3.1 ev or less.

The film thickness of the absorption layer 14 is not particularly limited, and is preferably 10 nm to 100 nm, for example. The film thickness of the absorption layer 14 can be measured by, for example, the above-mentioned electron microscopy method.

It should be noted that the absorption layer 14 can be formed as a high-density film by a method such as a vapor deposition method and a sputtering method. Further, the absorption layer 14 may include two or more layers having different constituent materials.

Next, the protection layer 15 will be described in detail. As described above, the protection layer 15 is formed on the surface of the grid-shaped projecting portion 11. The surface of the grid-shaped projecting portion 11 is covered with the protection layer 15. This not only allows the moisture resistance to be improved, but also makes it possible to suppress oxidation reaction more than necessary on a metal layer such as the reflection layer 12 constituting the grid-shaped projecting portion 11, resulting in the improvement in durability. However, the excessive formation of the protection layer 15 causes deterioration in optical characteristics and, in particular, lowers the transmittance important for the polarizing plate (in this specification, in particular, the transmittance of the TM wave (P wave), which is a polarized wave having an electric field component parallel to the X-axis direction). In this regard, in the polarizing plate 1 according to the present embodiment, high durability can be obtained while maintaining high transmittance characteristics by controlling the region where the protection layer 15 is formed and the thickness of the protection layer 15.

More specifically, the protection layer 15 is formed so as to cover all of the upper surface and the side surface of the absorption layer 14 and all of the side surface of the dielectric layer 13, and to cover at least a part of the side surface of the reflection layer 12. At the same time, the protection layer 15 on the side surface of the reflection layer 12 is formed thinner than the protection layer 15 on the side surface of the absorption layer 14. High transmittance characteristics and high durability are thereby obtained.

The protection layer 15 is preferably formed on both side surfaces of the grid-shaped projecting portion 11 so as to be symmetrical with respect to the grid-shaped projecting portion 11. In other words, it is preferable that the protection layer 15 is disposed symmetrically with respect to the grid-shaped projecting portion 11 in the X-axis direction. This allows desired polarization characteristics to be obtained.

Further, it is more preferable that the protection layer 15 on the side surface of the reflection layer 12 is thinner than the protection layer 15 on the side surface of the dielectric layer 13, and that the protection layer 15 on the side surface of the dielectric layer 13 is thinner than the protection layer 15 on the side surface of the absorption layer 14.

As a preferred mode for satisfying all of the above-mentioned thickness relationships, a mode is exemplified in FIG. 1 in which the thickness of the protection layer 15 on the side surface of the absorption layer 14, on the side surface of the dielectric layer 13, and on the side surface of the reflection layer 12 gradually decreases along these side surfaces as the protection layer 15 approaches the transparent substrate 10. In other words, it is preferable for the side surface of the protection layer 15 to be configured with an inclined surface that is inclined toward the grid-shaped projecting portion 11 as it approaches the transparent substrate 10. In this case, the grid-shaped projecting portion 11 including the protection layer 15 has an inverted taper shape as illustrated in FIG. 1.

However, as far as the thickness of the protection layer 15 satisfies the above-mentioned relationships, the protection layer 15 may be formed so as to decrease in thickness in a stepwise manner as approaching from the light incident side (the upper side in FIG. 1) toward the transparent substrate 10. At this time, the protection layer 15 may be formed so that the thickness thereof changes at the boundary between the absorption layer 14 and the dielectric layer 13 or at the boundary between the dielectric layer 13 and the reflection layer 12. Further, the protection layer 15 may be formed so that the thickness thereof changes between these boundaries, that is, at the side surfaces of the respective layers.

The thickness of the protection layer 15 on the upper surface of the absorption layer 14 is not particularly limited. For example, the thickness of the protection layer 15 on the upper surface of the absorption layer 14 is preferably set to be substantially the same as the thickness of the protection layer 15 on the side surface of the upper end portion of the absorption layer 14 (an end portion on the light incident side). Specifically, the thickness of the protection layer 15 on the upper surface of the absorption layer 14 is preferably 10 nm or more.

It is preferable for the protection layer 15 on the side surface of the reflection layer 12 to cover a region of 50% or less of the entire side surface of the grid-shaped projecting portion. This makes it possible to obtain high durability while maintaining high transmittance characteristics. This is because, as described above, since the pitch P (i.e., the grid interval) of the grid-shaped projecting portion 11 is on the order of nm, water hardly enters the inside of the grid (on the side of the grid-shaped projecting portion 11 closer to the transparent substrate 10), and since a region requiring protection from the viewpoint of improving durability such as moisture resistance is on the side of the grid-shaped projecting portion 11 closer to the absorption layer (on the light incident side), it is only necessary to protect the side of the grid-shaped projecting portion 11 closer to the absorption layer (the light incident side) in order to improve durability while suppressing a decrease in transmittance.

The broken line e in FIG. 1 illustrates a case where the protection layer 15 covers the entire side surface of the reflection layer 12 in a mode in which the protection layer 15 becomes thinner as approaching along the side surface of the grid-shaped projecting portion 11 toward the transparent substrate 10 (in FIG. 1, only the protection layer 15 on the left side surface of the grid-shaped projecting portion 11 is illustrated, for convenience). On the other hand, a case where the protection layer 15 covers 50% of the entire side surface of the grid-shaped projecting portion indicates a case where the lower end of the protection layer 15 (end closer to the transparent substrate 10) is disposed at the middle of the grid-shaped projecting portion in the height direction.

Here, the maximum width in the X-axis direction of the grid tip portion 17 of the grid-shaped projecting portion 11 including the protection layer 15 is referred to as a protection layer maximum width D, and the width d of the grid-shaped projecting portion excluding the protection layer 15 is referred to as a line width d (see FIG. 1). The line width d is preferably 35 nm to 45 nm, for example. The respective widths can be measured by, for example, the electron microscopy method described above.

The reflection layer 12 reflects light as described above; however, controlling the line width d causes the area of the reflection layer 12 seen from the light incident direction to change, whereby the amount of light reflected by the reflection layer 12 changes. Therefore, controlling the line width d at the grid tip portion 17 makes it possible to control the light transmission characteristics of the polarizing plate 1. Further, controlling the protection layer maximum width D also allows the refraction influence of the incident light path to fluctuate, thereby making it possible to control the light transmission characteristics.

Further, as illustrated in FIG. 1, it is preferable for the angle of the side surface incident angle α to be calculated by the following equation (1). The side surface incident angle α is defined by the angle formed by the incident light L incident from the direction perpendicular to the main surface of the transparent substrate 10 and the side incident surface normal line N orthogonal to the side surface of the protection layer 15. This makes it possible to suppress the deterioration of the transmittance characteristics.

[Equation 2]

$$\alpha = 90 - \tan^{-1}\left(\frac{\frac{(D-d)}{2}}{c(t1+t2+t3)}\right)(deg) \quad (1)$$

(In equation (1), D represents the maximum width (nm) of the protection layer, d represents the width (nm) of the grid-shaped projecting portion, c represents the coverage (c≤0.5) of the protection layer on the side surface of the grid-shaped projecting portion, t1 represents the film thickness (nm) of the absorption layer, t2 represents the film thickness (nm) of the dielectric layer, and t3 represents the film thickness (nm) of the reflection layer.)

Figure 2A:
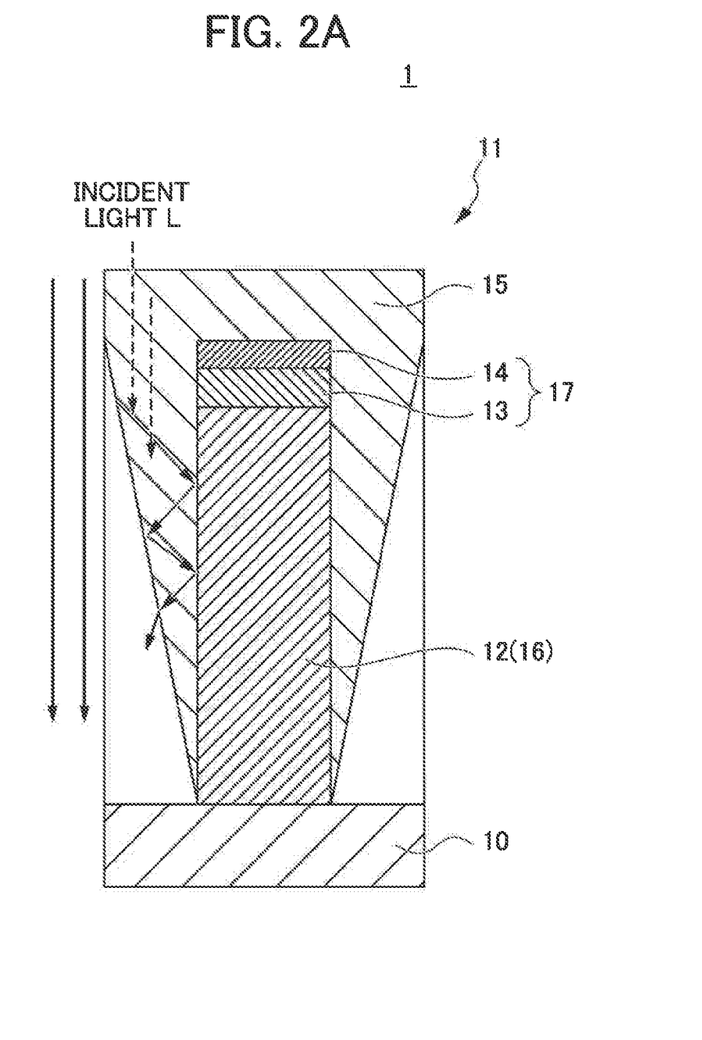
FIG. 2A is a diagram illustrating a relationship between a side surface incident angle and a total reflection critical angle of the polarizing plate according to the above embodiment.
Figure 2B:
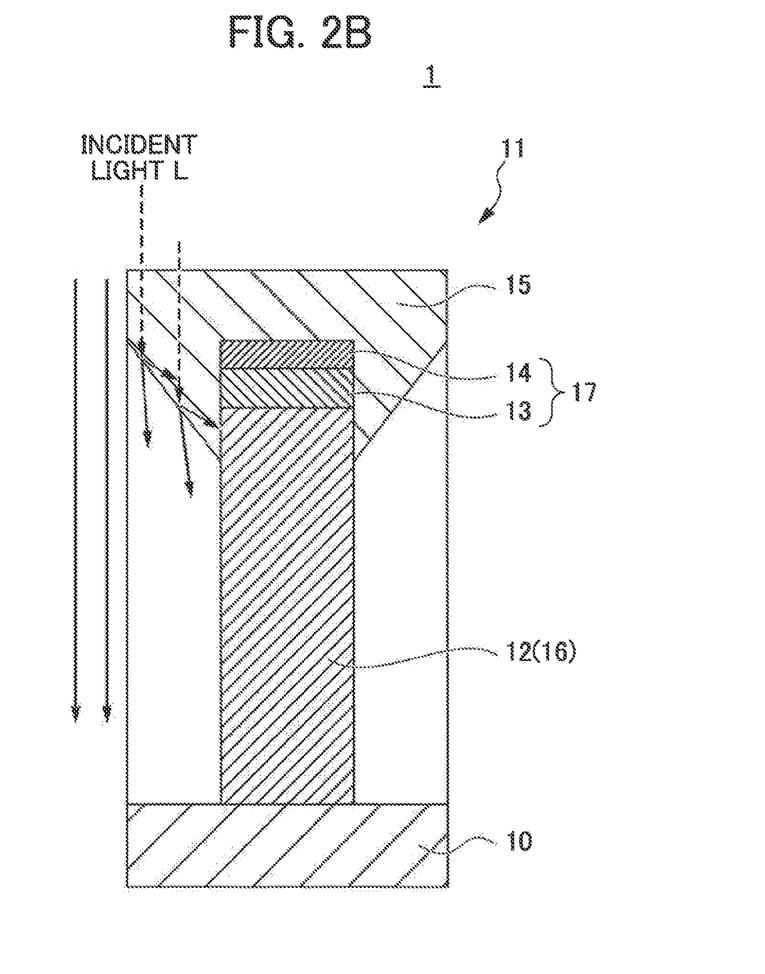
FIG. 2B is a diagram illustrating the relationship between the side surface incident angle and the total reflection critical angle of the polarizing plate according to the above embodiment.

Here, with reference to FIGS. 2A to 2C, the relationship between the side surface incident angle α and the total reflection critical angle will be described. FIG. 2A and FIG. 2B are diagrams illustrating the relationship between the side surface incident angle and the total reflection critical angle of the polarizing plate 1 according to the present embodiment. Specifically, FIG. 2A illustrates a case where the protection layer 15 covers the entire side surface of the reflection layer 12, and FIG. 2B illustrates a case where the protection layer 15 covers only a part of the upper end of the reflection layer 12. Further, FIG. 2C is a diagram illustrating the total reflection critical angle.

Figure 2C:
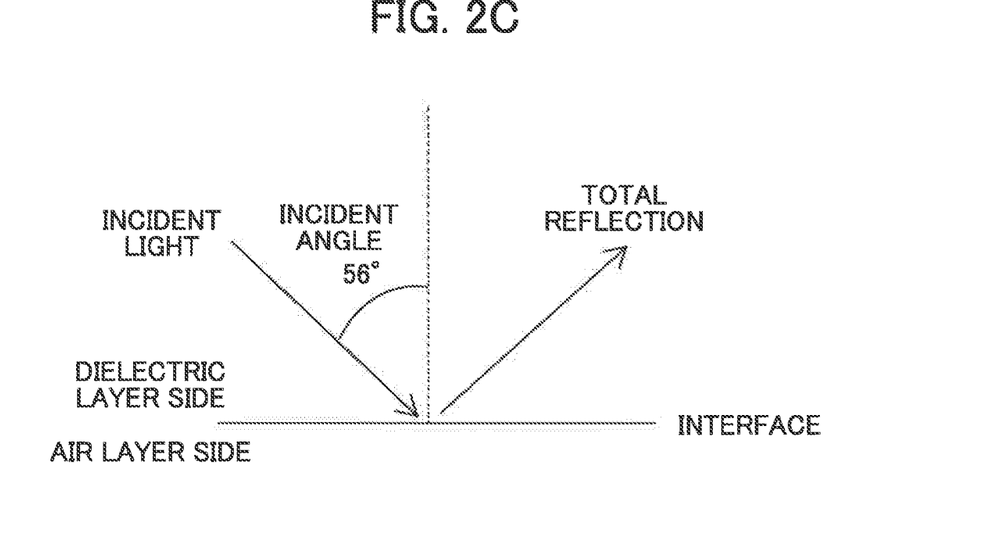
FIG. 2C is a diagram illustrating the total reflection critical angle.

On the basis of the Applicant's investigation, it has been found that the total reflection critical angle of the protection layer 15 and air layer is 56 degrees (see FIG. 2C). Further, in the polarizing plate 1 according to the present embodiment, it has been found that, by providing the above-described protection layer 15, the side surface incident angle α is 56 degrees or more of the total reflection critical angle (see FIG. 7 described later). Therefore, it is considered that the incident light L transmitted through the protection layer 15 as illustrated in FIG. 2A is totally reflected at the interface with the air layer, and the resultant refracted light to the reflection layer 12 is increased. The refracted incident light is reflected by the side surface of the reflection layer 12, and the reflected light repeats the total reflection until the side surface incident angle α is equal to or less than the total reflection critical angle. Due to there also being the absorption of light at the reflection layer 12, which also becomes the cause of scattering of the light, this results in a decrease in transmittance. On the other hand, as illustrated in FIG. 2B, in a case where the film thickness (coating thickness) of the protection layer 15 on the side surface is reduced, the incident angle to the protection layer 15 is reduced. In particular, in a case where the angle is equal to or less than the total reflection critical angle, the incident light L passing through the interface between the protection layer 15 and the air layer increases, and the refracted light to the reflection layer 12 is reduced. It is considered that this reduces the decrease in transmittance due to the absorption and the scattering, and reduces the coating thickness, and thus, it is also considered that the transmittance of the polarized wave (TM wave (P wave)) having the electric field component parallel to the X-axis direction increases.

The protection layer 15 formed as described above is constituted by a dielectric film. The protection layer 15 can be uniformly formed on the surface of the polarizing plate 1 (on the surface on which the wire grid is formed), for example, by CVD (Chemical Vapor Deposition), sol-gel method, or the like. However, a protection layer of excessive thickness may possibly cause deterioration in optical characteristics. In particular, since the transmittance, which is important for the polarizing plate, is sensitive to the thickness of the protection layer, it is desirable to be thinner. Therefore, controlling various conditions of the vacuum film forming method allows for control of the film-forming particles going around (e.g., wrapping) the grid-shaped projecting portion 11. For example, vapor deposition is performed on the grid-shaped projecting portion 11 formed on the transparent substrate 10 from a direction inclined with respect to the main surface of the transparent substrate 10. This makes it possible to control, by the shadowing effect, the going around (e.g., wrapping) of the film-forming particles into the grid-shaped projecting portion 11 (i.e. on the side closer to the transparent substrate 10), thereby forming the protection layer 15.

The polarizing plate 1 according to the present embodiment including the above-described configuration may further include a pedestal provided between the transparent substrate 10 and the reflection layer 12. The pedestal is configured to have a rectangular shape or a trapezoidal shape (tapered shape) when viewed from the direction (predetermined direction) in which each one-dimensional grid extends, that is, in a cross-sectional view orthogonal to the predetermined direction. The film thickness of the pedestal is set to, for example, 10 nm to 100 nm, and a material constituting the film is transparent to light in the used bandwidth, and preferably has a refractive index smaller than that of the transparent substrate 10, and in particular, a Si oxide such as $SiO_2$ is preferable. It is possible to form the pedestal by, for example, changing, in a stepwise manner, the balance between isotropic etching and anisotropic etching by dry etching with respect to an underlayer consisting of the dielectric substance formed on the transparent substrate 10.

Further, the polarizing plate 1 may have a diffusion barrier layer between the dielectric layer 13 and the absorption layer 14. In such a case, the grid-shaped projecting portion 11 includes the pedestal formed as necessary, the reflection layer 12, the dielectric layer 13, the diffusion barrier layer, the absorption layer 14, and the protection layer 15 in order from the transparent substrate 10. Including the diffusion barrier layer allows for the prevention of diffusion of light in the absorption layer 14. The diffusion barrier layer is constituted by a metal film including, for example, Ta, W, Nb, or Ti.

Further, in the polarizing plate 1 according to the present embodiment, the surface on the light incident side may be covered with a water-repellent layer. The water-repellent layer preferably contains fluorine and has a thickness of 5 nm or less. The water-repellent layer can be formed by employing, for example, the abovementioned CVD or ALD. This makes it possible to improve the reliability of the moisture resistance and the like of the polarizing plate 1.

(Method of Manufacturing Polarizing Plate)

A method of manufacturing the polarizing plate 1 according to the present embodiment includes a reflection layer forming step, a dielectric layer forming step, an absorption layer forming step, an etching step, and a protection layer forming step.

In the reflection layer forming step, a reflection layer is formed on the underlayer formed on the transparent substrate 10 as necessary. In the dielectric layer forming step, a dielectric layer is formed on the reflection layer formed in the reflection layer forming step. In the absorption layer forming process, an absorption layer is formed on the dielectric layer formed in the dielectric layer forming step. In each of these layer forming steps, each layer can be formed by, for example, a sputtering method or a vapor deposition method.

In the etching step, by selectively etching a laminate formed through the above-described layer forming processes, the grid-shaped projecting portions 11 to be arranged on the transparent substrate 10 at a pitch shorter than the wavelength of the light in the used bandwidth are formed. More specifically, a mask pattern having a one-dimensional grid pattern is formed by, for example, photolithography or nanoimprinting. Thereafter, the laminate is selectively etched to thereby form the grid-shaped projecting portion 11 to be arranged on the transparent substrate 10 at a pitch shorter than the wavelength of the light in the used bandwidth. As an etching method, for example, a dry etching method using an etching gas suitable for the etching target is exemplified. It should be noted that, in a case where an underlayer is formed, the underlayer can be etched to form a pedestal by optimizing the etching conditions.

The protection layer forming step includes a step of coating the surface of the grid-shaped projecting portion 11 with the protection layer 15. Specifically, the protection layer 15 is formed by a film forming method such as oblique vapor deposition, and the resultant protection layer 15 covers all of the upper surface and the side surface of the absorption layer 14 and all of the side surface of the dielectric layer 13, and covers at least a part of the side surface of the reflection layer 12. Further, at this time, the thickness of the protection layer 15 on the side surface of the reflection layer 12 is adjusted to be thinner than the thickness of the protection layer 15 on the side surface of the absorption layer 14 by controlling the film formation conditions and the shadowing effect.

Further, the method of manufacturing the polarizing plate 1 according to the present embodiment may further include a step of coating the surface of the grid-shaped projecting portion 11 with the water-repellent layer. The protection layer 15 and the water-repellent layer are formed by the above-described CVD, ALD, or the like. As described above, the polarizing plate 1 according to the present embodiment is manufactured.

(Optical Apparatus)

The optical apparatus according to the present embodiment includes the polarizing plate 1 according to the present embodiment described above. Examples of the optical apparatus include a liquid crystal projector, a heads-up display, and a digital camera. The polarizing plate 1 according to the present embodiment is an inorganic polarizing plate which is superior in heat resistance to an organic polarizing plate and, therefore, is suitable for use in a liquid crystal projector, a heads-up display, or the like which requires heat resistance.

In a case where the optical apparatus according to the present embodiment includes a plurality of polarizing plates, it suffices that at least one of the plurality of polarizing plates is the polarizing plate 1 according to the present embodiment. For example, in the case where the optical apparatus according to the present embodiment is a liquid crystal projector, it suffices that at least one of the polarizing plates disposed on the entrance side and the exit side of the liquid crystal panel is the polarizing plate 1 according to the present embodiment.

Modification Example

It should be noted that the present invention is not limited to the above-mentioned embodiments, and variations and improvements within a range that can achieve the object of the present invention are included in the present invention. For example, the application of the polarizing plate of the present embodiment is not limited to a liquid crystal projector, and can be used for various applications.

Figure 3:
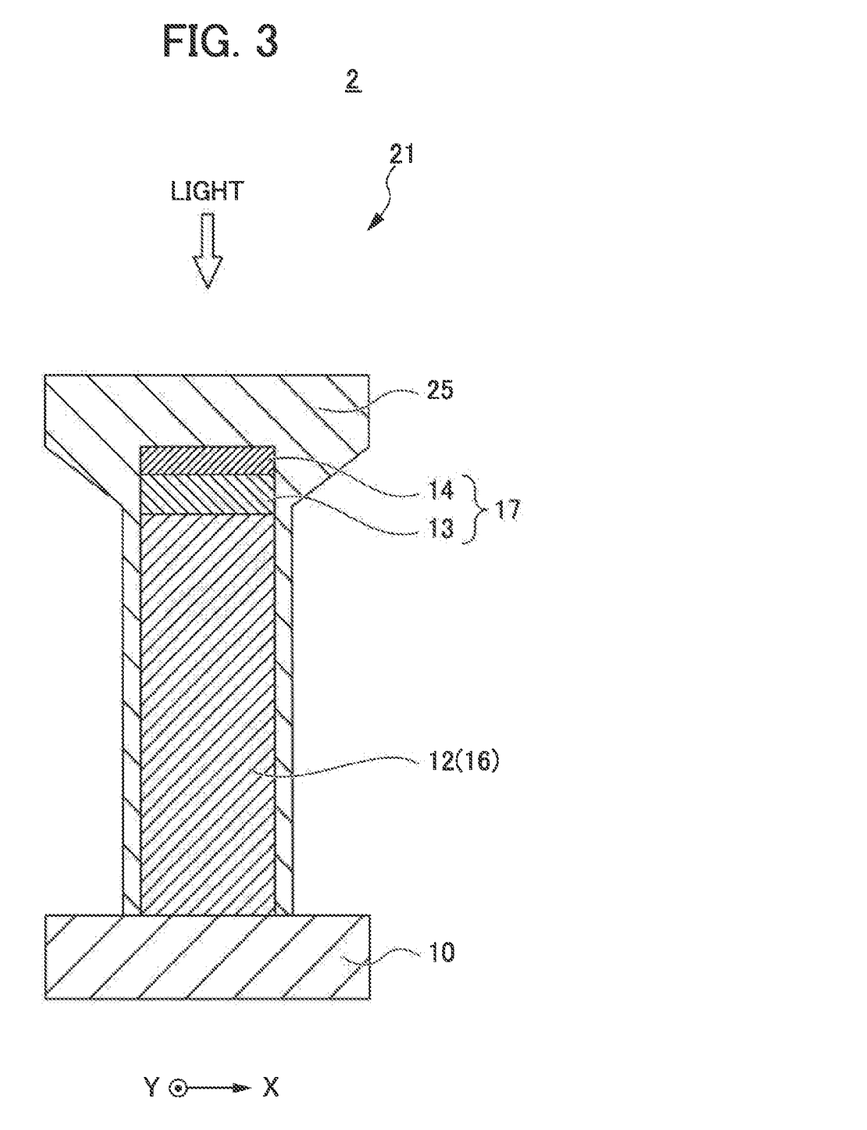
FIG. 3 is a schematic cross-sectional view of a polarizing plate according to a modification example of the above embodiment.

Here, FIG. 3 is a schematic cross-sectional view illustrating a polarizing plate 2 according to a modification example of the above embodiment. The polarizing plate 2 according to the modification example has the same configuration as that of the polarizing plate 1 except that the configuration of the protection layer 25 is different from that of the polarizing plate 1 illustrated in FIG. 1 described above. In FIG. 3, the same components as those of the polarizing plate 1 illustrated in FIG. 1 are denoted by the same reference numerals, and descriptions thereof are omitted below.

As illustrated in FIG. 3, the protection layer 25 of the polarizing plate 2 is the same as that of the polarizing plate 1 illustrated in FIG. 1 in that it covers all of the upper surface, the side surface of the absorption layer 14 and all of the side surface of the dielectric layer 13. However, the protection layer 15 of the polarizing plate 1 covers only a part of the side surface of the reflection layer 12; whereas, the protection layer 25 of the polarizing plate 2 covers all of the side surface of the reflection layer 12.

The protection layer 25 on the side surface of the reflection layer 12 is formed thinner than the protection layer 25 on the side surface of the absorption layer 14. More specifically, the protection layer 25 on the side surface of the absorption layer 14 and the side surface of the dielectric layer 13 is formed so as to be inclined more toward the grid-shaped projecting portion 11 along these side surfaces as approaching the transparent substrate 10. On the contrary, the protection layer 25 on the side surface of the reflection layer 12 is formed to have a substantially uniform thickness.

The polarizing plate 2 is manufactured, for example, as follows. Similarly to the polarizing plate 1 described above, after the grid-shaped projecting portion 11 is formed on the transparent substrate 10, the entire surface of the grid-shaped projecting portion 11 is thinly coated with the protection layer 25 by CVD, ALD, or the like. Next, similarly to the polarizing plate 1 described above, the protection layer 25 having an inversely tapered shape is formed on the grid tip portion 17 (absorption layer 14 and dielectric layer 13) by a film forming method such as oblique vapor deposition. This makes it possible to manufacture the polarizing plate 2.

As in the present modification example, forming the protection layer 25 in parallel with the side surface of the reflection layer for protecting the lower end of the reflection layer 12 (i.e., end portion closer to the transparent substrate 10) is effective as a method for improving durability, while maintaining the transmittance characteristics.

EXAMPLES

Next, Examples of the present invention will be described. However, the present invention is not limited to these Examples.

Example 1 and Example 2

In Example 1 and Example 2, each polarizing plate 1 having the structure illustrated in FIG. 1 and having the parameters shown in Table 1 below was subjected to simulation. More specifically, the optical characteristics of these polarizing plates were verified by electromagnetic field simulation according to the Rigorous Coupled Wave Analysis (RCWA) method. For the simulation, grating simulator Gsolver available from Grating Solver Development Company was used. In addition, aluminum was used as the reflection layer, silica was used as the dielectric layer, silicon was used as the absorption layer, and silica was used as the protection layer.

TABLE 1

|  | Example 1 | Example 2 |
|---|---|---|
| Pitch of grid-shaped projecting portion (nm) | 150 | 150 |
| Line width (nm) | 37.5 | 37.5 |
| Reflection layer film thickness (nm) | 165 | 165 |
| Dielectric layer film thickness (nm) | 15 | 17 |
| Absorption layer film thickness (nm) | 10 | 14 |
| Protection layer film thickness (nm) | 10 | 24 |
| Protection layer maximum width (nm) | 51 | 90 |

For each of the polarizing plates according to Example 1 and Example 2, P-polarized light transmittance (transmittance of a polarized wav TM wave (P wave) having an electric field component parallel to the X-axis direction) was examined when the coating area of the protection layer on the side surface of the reflection layer was changed in a stepwise manner from 100% to zero. The results are shown in FIGS. 4 and 5.

Figure 4:
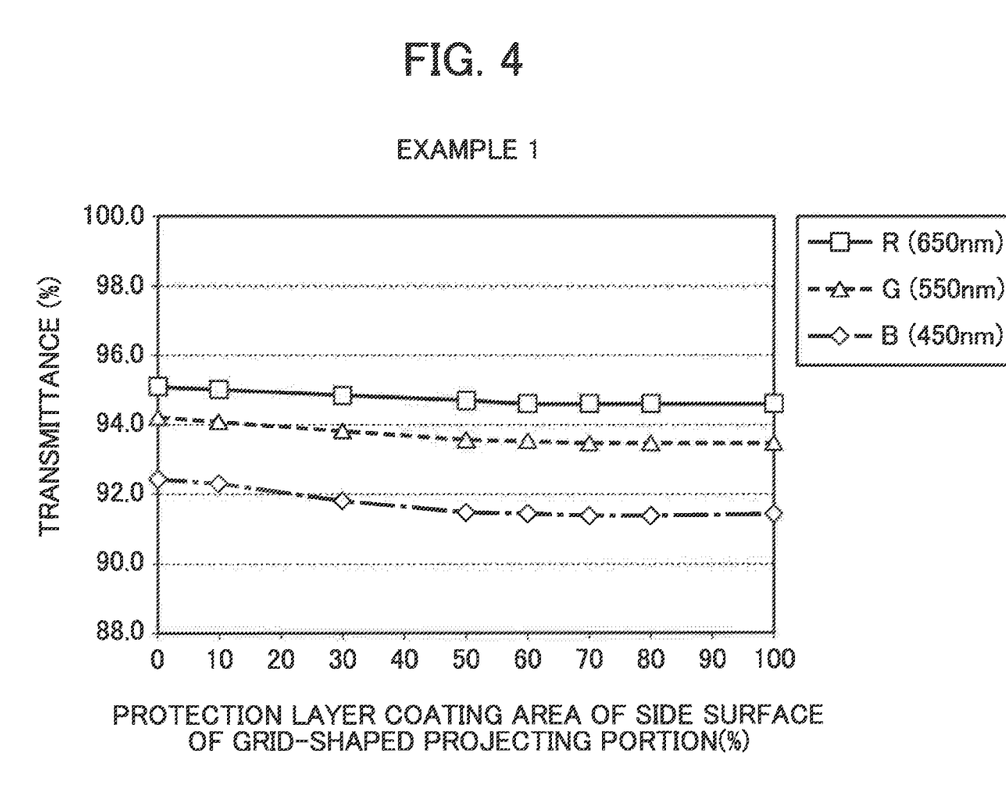
FIG. 4 is a graph showing transmittance characteristics of a polarizing plate according to Example 1.

Here, FIG. 4 is a graph showing transmittance characteristics of the polarizing plate according to Example 1. FIG. 5 is a graph showing transmittance characteristics of the polarizing plate according to Example 2. In FIGS. 4 and 5, the horizontal axis represents the percentage (%) of the coating area of the protection layer on the side surface of the reflection layer. Further, the vertical axis represents the P-polarized light transmittance (%) of each color channel (blue: 450 nm, green: 550 nm, and red: 650 nm).

Figure 5:
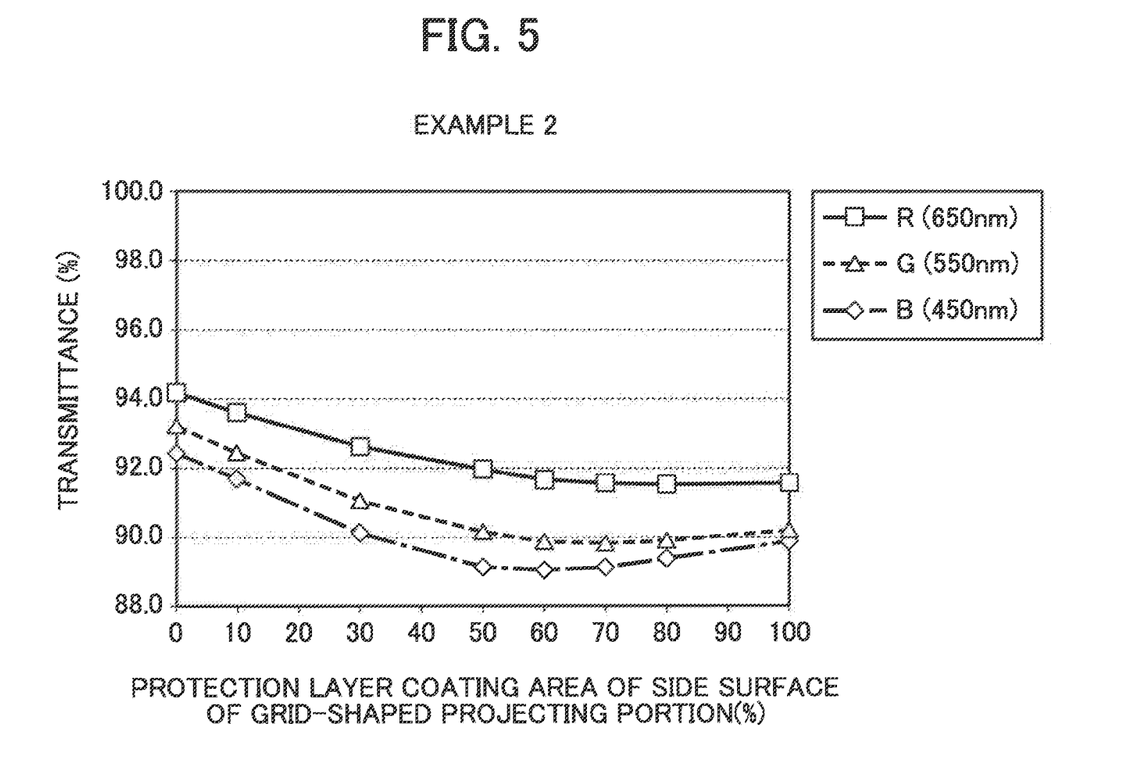
FIG. 5 is a graph showing transmittance characteristics of a polarizing plate according to Example 2.

From the results of FIGS. 4 and 5, it was found that the P-polarized light transmittance temporarily decreased as the coating area of the protection layer on the side surface of the reflection layer decreased from 100%. It is considered that this is because, when the P-polarized light, which is transmitted light, passes through the protection layer consisting of dielectric film, the P-polarized light is refracted at the interface between the protection layer and the air layer, and the resultant refracted incident light is reflected on the side surface of the reflection layer, and in addition, the light is absorbed in the reflection layer which also causes scattering, resulting in the decrease in transmittance. Further, from the results of FIGS. 4 and 5, it was found that, when the coating area of the protection layer on the side surface of the reflection layer became 50% or less, the P-polarized light transmittance increased.

Figure 6:
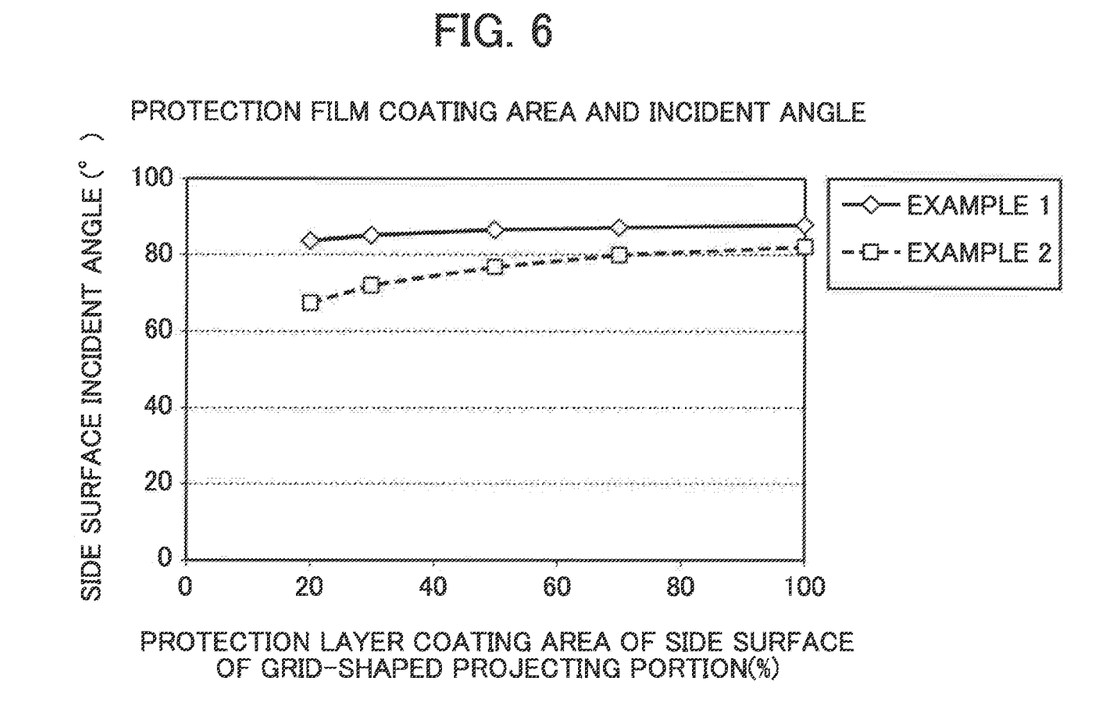
FIG. 6 is a view showing side surface incident angles of the polarizing plates according to Example 1 and Example 2.

Here, the relationship between the percentage of the coating area of the protection layer on the side surface of the reflection layer and the side surface incident angle was examined for the polarizing plates according to Example 1 and Example 2. These results are shown in FIG. 6. FIG. 6 is a view showing side surface incident angles of the polarizing plates according to Example 1 and Example 2. In FIG. 6, the horizontal axis represents the percentage (%) of the coating area of the protection layer on the side surface of the reflection layer. Further, the vertical axis represents the side surface incident angle (°).

As shown in FIG. 6, it was found that the side surface incident angles of the polarizing plates according to Example 1 and Example 2 were 56 degrees or more of the total reflection critical angle. Therefore, it is considered that the refracted light to the reflection layer is increased with these polarizing plates. It is considered that, when the coating percentage is high, the side surface incident angle α exceeds the total reflection critical angle, the refracted incident light is totally reflected on the side surface of the reflection layer, and the resultant reflection light repeats the total reflection until the side surface incident angle α becomes less than or equal to the total reflection critical angle, and the transmittance is decreased due to absorption and scattering in the reflection layer. It is also considered that, when the coating thickness of the side surface is reduced, the incident angle to the protection film is reduced, and in particular, when the angle is equal to or less than the total reflection critical angle, the incident light passing through the interface between the protection film and the air layer is increased, and the refracted light to the reflection layer is reduced, so that the decrease in transmittance due to absorption and scattering is also reduced.

In addition, it has been found that, as the percentage of the coating area of the protection layer on the side surface of the reflection layer decreases, the side surface incident angle decreases and the thickness of the protection layer decreases simultaneously, and the P-polarized light transmittance starts to increase. Comparing FIG. 4 with FIG. 5, the polarizing plate according to Example 2 shown in FIG. 5 has a greater dependence of the P-polarized light transmittance on the thickness of the protection layer. This coincides with the fact that the change of the side surface incident angle becomes greater as the thickness of the protection layer of the polarizing plate according to Example 2 becomes thinner in FIG. 5. Summarizing the above results, it can be recognized that the coating area of the protection layer on the side surface of the reflection layer is preferably 50% or less.

Example 3

In Example 3, each polarizing plate 2 having the structure shown in FIG. 3 and having the parameters shown in Table 2 below was subjected to simulation. The simulation was performed under the same conditions as those in Examples 1 and 2. The P-polarized light transmittance of each wavelength obtained as a result of the simulation is shown in Table 3.

TABLE 2

|  | Example 3 |
| --- | --- |
| Pitch of grid-shaped projecting portion (nm) | 150 |
| Line width (nm) | 37.5 |
| Reflection layer film thickness (nm) | 165 |
| Dielectric layer film thickness (nm) | 17 |
| Absorption layer film thickness (nm) | 14 |
| Protection layer film thickness (nm) | 24 |
| Protection layer maximum width (nm) | 90 |
| Side surface coverage (%) | 15.8 |
| Protection layer width of reflection layer lower portion (nm) | 10 |

TABLE 3

| Wavelength | Transmittance (%) |
| --- | --- |
| R (650 nm) | 93.54 |
| G (550 nm) | 92.38 |
| B (450 nm) | 91.06 |

From the results shown in Table 3, it was confirmed that, even the polarizing plate according to the modification example of the above embodiment still can obtain P-polarized light transmittance comparable to that of the polarizing plate according to the above embodiment.

From the above results, it was confirmed that, according to the polarizing plate of the present invention, it is possible to suppress, in comparison with a conventional polarizing plate, the deterioration of the transmittance characteristics caused by covering the side surface of the reflection layer with the protection layer, and it is possible to achieve both high transmittance characteristics and high durability.

EXPLANATION OF REFERENCE NUMERALS 1 polarizing plate
10 transparent substrate
11 grid-shaped projecting portion
12 reflection layer
13 dielectric layer
14 absorption layer
15 protection layer
L incident light
N side incident surface normal line
α side surface incident angle

What is claimed is:

1. A polarizing plate with a wire grid structure, the polarizing plate comprising:
   a transparent substrate; and
   a grid-shaped projecting portion that is arranged on the transparent substrate at a pitch shorter than a wavelength of light in a used bandwidth, and extends in a predetermined direction, wherein
      the grid-shaped projecting portion includes a reflection layer, a dielectric layer, and an absorption layer in order from a side of the transparent substrate,
      a protection layer is provided on a surface of the grid-shaped projecting portion, and is configured to cover all of an upper surface and a side surface of the absorption layer and all of a side surface of the dielectric layer, and cover at least a part of a side surface of the reflection layer,
      the protection layer on the side surface of the reflection layer is thinner than the protection layer on the side surface of the absorption layer, and
      a water-repellent layer covering the protection layer is provided on a surface of the grid-shaped projecting portion.

2. The polarizing plate according to claim 1, wherein
   the protection layer on the side surface of the reflection layer is thinner than the protection layer on the side surface of the dielectric layer, and
   the protection layer on the side surface of the dielectric layer is thinner than the protection layer on the side surface of the absorption layer.

3. The polarizing plate according to claim 1, wherein the protection layer on the side surface of the absorption layer, on the side surface of the dielectric layer, and on the side surface of the reflection layer becomes thinner as approaching the transparent substrate along the side surfaces.

4. The polarizing plate according to claim 1, wherein the protection layer on the side surface of the reflection layer covers 50% or less of an entire side surface of the grid-shaped projecting portion.

5. The polarizing plate according to claim 1, wherein an angle of a side surface incident angle α is calculated by equation (1) below, the side surface incident angle α being defined by an angle formed by incident light that is incident from a direction perpendicular to a main surface of the transparent substrate and a side incident surface normal line that is orthogonal to the side surface of the protection layer,

[Equation 3]

$$\alpha = 90 - \tan^{-1}\left(\frac{\frac{(D-d)}{2}}{c(t1 + t2 + t3)}\right)(deg) \quad (1)$$

wherein D represents a maximum width (nm) of the protection layer, d represents a width (nm) of the grid-shaped projecting portion, c represents a coverage (c≤0.5) of the protection layer on the side surface of the grid-shaped projecting portion, t1 represents a film thickness (nm) of the absorption layer, t2 represents a film thickness (nm) of the dielectric layer, and t3 represents a film thickness (nm) of the reflection layer.

6. The polarizing plate according to claim 1, wherein each of the reflection layer, the dielectric layer, the absorption layer, and the protection layer comprises an inorganic material.

7. An optical apparatus comprising the polarizing plate according to claim 1.

8. A polarizing plate with a wire grid structure, the polarizing plate comprising:
  a transparent substrate; and
  a grid-shaped projecting portion that is arranged on the transparent substrate at a pitch shorter than a wavelength of light in a used bandwidth, and extends in a predetermined direction, wherein
    the grid-shaped projecting portion includes a reflection layer, a dielectric layer, and an absorption layer in order from a side of the transparent substrate,
    a protection layer is provided on a surface of the grid-shaped projecting portion, and is configured to cover all of an upper surface and a side surface of the absorption layer and all of a side surface of the dielectric layer, and cover at least a part of a side surface of the reflection layer,
    the protection layer on the side surface of the reflection layer is thinner than the protection layer on the side surface of the absorption layer,
    a water-repellent layer covering the protection layer is provided on a surface of the grid-shaped projecting portion, and
    wherein the water-repellent layer comprises fluorine and has a thickness of 5 nm or less.

9. The polarizing plate according to claim 8, wherein
  the protection layer on the side surface of the reflection layer is thinner than the protection layer on the side surface of the dielectric layer, and
  the protection layer on the side surface of the dielectric layer is thinner than the protection layer on the side surface of the absorption layer.

10. The polarizing plate according to claim 8, wherein the protection layer on the side surface of the absorption layer, on the side surface of the dielectric layer, and on the side surface of the reflection layer becomes thinner as approaching the transparent substrate along the side surfaces.

11. The polarizing plate according to claim 8, wherein the protection layer on the side surface of the reflection layer covers 50% or less of an entire side surface of the grid-shaped projecting portion.

12. The polarizing plate according to claim 8, wherein an angle of a side surface incident angle α is calculated by equation (1) below, the side surface incident angle α being defined by an angle formed by incident light that is incident from a direction perpendicular to a main surface of the transparent substrate and a side incident surface normal line that is orthogonal to the side surface of the protection layer,

[Equation 1]

$$\alpha = 90 - \tan^{-1}\left(\frac{\frac{(D-d)}{2}}{c(t1+t2+t3)}\right)(deg) \quad (1)$$

wherein D represents a maximum width (nm) of the protection layer, d represents a width (nm) of the grid-shaped projecting portion, c represents a coverage (c≤0.5) of the protection layer on the side surface of the grid-shaped projecting portion, t1 represents a film thickness (nm) of the absorption layer, t2 represents a film thickness (nm) of the dielectric layer, and t3 represents a film thickness (nm) of the reflection layer.

13. The polarizing plate according to claim 8, wherein each of the reflection layer, the dielectric layer, the absorption layer, and the protection layer comprises an inorganic material.

14. An optical apparatus comprising the polarizing plate according to claim 8.

15. A polarizing plate with a wire grid structure, the polarizing plate comprising:
  a transparent substrate; and
  a grid-shaped projecting portion that is arranged on the transparent substrate at a pitch shorter than a wavelength of light in a used bandwidth, and extends in a predetermined direction, wherein
    the grid-shaped projecting portion includes a reflection layer, a dielectric layer, and an absorption layer in order from a side of the transparent substrate,
    a protection layer is provided on a surface of the grid-shaped projecting portion, and is configured to cover all of an upper surface and a side surface of the absorption layer and all of a side surface of the dielectric layer, and cover at least a part of a side surface of the reflection layer,
    the protection layer on the side surface of the reflection layer is thinner than the protection layer on the side surface of the absorption layer,
    the protection layer on the side surface of the reflection layer is thinner than the protection layer on the side surface of the dielectric layer,
    the protection layer on the side surface of the dielectric layer is thinner than the protection layer on the side surface of the absorption layer
    a water-repellent layer covering the protection layer is provided on a surface of the grid-shaped projecting portion.

16. The polarizing plate according to claim 15, wherein the protection layer on the side surface of the absorption layer, on the side surface of the dielectric layer, and on the side surface of the reflection layer becomes thinner as approaching the transparent substrate along the side surface.

17. The polarizing plate according to claim 15, wherein the protection layer on the side surface of the reflection layer covers 50% or less of an entire side surface of the grid-shaped projecting portion.

18. The polarizing plate according to claim 15, wherein an angle of a side surface incident angle α is calculated by equation (1) below, the side surface incident angle α being defined by an angle formed by incident light that is incident from a direction perpendicular to a main surface of the transparent substrate and a side incident surface normal line that is orthogonal to the side surface of the protection layer,

[Equation 1]

$$\alpha = 90 - \tan^{-1}\left(\frac{\frac{(D-d)}{2}}{c(t1+t2+t3)}\right)(deg) \quad (1)$$

wherein D represents a maximum width (nm) of the protection layer, d represents a width (nm) of the grid-shaped projecting portion, c represents a coverage ($c \leq 0.5$) of the protection layer on the side surface of the grid-shaped projecting portion, t1 represents a film thickness (nm) of the absorption layer, t2 represents a film thickness (nm) of the dielectric layer, and t3 represents a film thickness (nm) of the reflection layer.

19. The polarizing plate according to claim 15, wherein each of the reflection layer, the dielectric layer, the absorption layer, and the protection layer comprises an inorganic material.

20. An optical apparatus comprising the polarizing plate according to claim 15.

* * * * *